(12) United States Patent
Nishiguchi et al.

(10) Patent No.: US 7,973,097 B2
(45) Date of Patent: Jul. 5, 2011

(54) INK JET PIGMENT INK AND INK SET

(75) Inventors: Kenji Nishiguchi, Yokohama (JP); Yuko Nishiwaki, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 208 days.

(21) Appl. No.: 12/106,727

(22) Filed: Apr. 21, 2008

(65) Prior Publication Data

US 2008/0269407 A1 Oct. 30, 2008

(30) Foreign Application Priority Data

Apr. 24, 2007 (JP) ................................. 2007-114678

(51) Int. Cl.
*C09D 11/00* (2006.01)
*C09D 5/00* (2006.01)

(52) U.S. Cl. ....... 523/160; 106/31.6; 525/242; 525/301; 347/100; 524/556

(58) Field of Classification Search ................. 523/160; 524/592, 543, 556, 560; 525/191, 221, 241, 525/242, 244, 296, 298, 301, 309, 310; 106/31.6; 347/100
See application file for complete search history.

(56) References Cited

U.S. PATENT DOCUMENTS

| | | | |
|---|---|---|---|
| 4,723,129 A | 2/1988 | Endo et al. | 346/1.1 |
| 4,740,796 A | 4/1988 | Endo et al. | 346/1.1 |
| 4,849,774 A | 7/1989 | Endo et al. | 346/140 R |
| 5,122,814 A | 6/1992 | Endo et al. | 346/33 R |
| 5,159,349 A | 10/1992 | Endo et al. | 346/33 A |
| 5,521,621 A | 5/1996 | Endo et al. | 347/15 |
| 5,754,194 A | 5/1998 | Endo et al. | 347/15 |
| 6,117,921 A | 9/2000 | Ma et al. | 523/161 |
| 7,378,459 B2 | 5/2008 | Nishiguchi | 523/160 |
| 2004/0212667 A1 | 10/2004 | Nishiguchi et al. | 347/96 |
| 2006/0012627 A1 | 1/2006 | Nakazawa et al. | 347/21 |
| 2007/0287769 A1 | 12/2007 | Nishiwaki et al. | 523/160 |
| 2007/0287770 A1 | 12/2007 | Nishiguchi et al. | 523/160 |

FOREIGN PATENT DOCUMENTS

| | | |
|---|---|---|
| EP | 0 826 751 A2 | 3/1998 |
| EP | 1 445 291 A2 | 8/2004 |
| EP | 1 522 562 A1 | 4/2005 |
| JP | S61-059911 | 3/1986 |
| JP | 6-100810 | 4/1994 |
| JP | 10-87768 | 4/1998 |
| JP | 2004-160996 | 6/2004 |

OTHER PUBLICATIONS

Aug. 12, 2009 European Search Report in European Patent Appln. No. 08155020.

*Primary Examiner* — Irina S. Zemel
*Assistant Examiner* — Jeffrey Lenihan
(74) *Attorney, Agent, or Firm* — Fitzpatrick, Cella, Harper & Scinto

(57) ABSTRACT

An ink jet pigment ink containing water, a pigment, a water-soluble organic solvent and a graft copolymer, wherein the graft copolymer has a hydrophilic segment and a hydrophobic segment, the hydrophobic segment is being obtained by copolymerizing an anionic monomer and an aromatic monomer represented by the following formula (1), and the hydrophilic segment is being obtained by polymerizing an anionic monomer

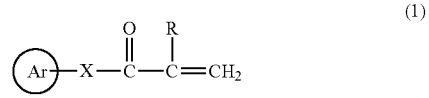

(1)

wherein Ar is an aromatic ring selected from a benzene ring, a condensed benzene ring and a hetero-aromatic ring, or a derivative thereof, R is H or $CH_3$, and X is O or NH.

5 Claims, No Drawings

INK JET PIGMENT INK AND INK SET

BACKGROUND OF THE INVENTION

1. Field of the Invention

The present invention relates to an ink jet pigment ink (that hereinafter may also be referred to as "pigment ink" merely), by which a resulting recorded article exhibits high color development even when high-speed printing is conducted by means of a high-density nozzle and high ejection stability is obtained, and to an ink set.

2. Related Background Art

An ink-jet recording method is a technique wherein minute droplets of a recording liquid (ink) are ejected to apply them to a recording medium such as paper, thereby conducting recording. There is a method such that electrothermal converters are used as ejection-energy supply means in particular to apply thermal energy to an ink so as to generate bubbles, thereby ejecting droplets of the ink (see Japanese Patent Publication No. S61-59911). According to this method, the utilization of a high-density multi-orifice in an ink-jet recording head can be realized with ease, and high-resolution and high-quality images can be recorded at high speed.

On the other hand, a coloring material contained in an ink has heretofore been mainly on a dye dissolvable in an ink solvent, but an investigation with a view toward using a pigment from the viewpoints of light fastness and water fastness has been advanced. However, the pigment may aggregate or precipitate in some cases without being dissolved in the ink solvent, so that it has been extremely difficult to retain stable physical properties of an ink-jet ink. There is a method that electrothermal converters are used as ejection-energy supply means in particular to apply thermal energy to an ink so as to generate bubbles, thereby ejecting droplets of the ink. In this method, it is predicted that the physical properties of the ink greatly change within an ejection orifice and in the vicinity thereof, and so pigment particles have a tendency to easily aggregate within the ejection orifice and in the vicinity thereof. As a result, the ink droplets may have been ejected in an undesired direction in some cases, or the ejection orifice may have been closed in an extreme case.

In a pigment ink, the dispersion stabilization of pigment particles is achieved by causing a dispersion resin to be adsorbed on the surfaces of the pigment particles. The pigment particles dispersed by the dispersion resin are treated with the mechanism of dispersion/aggregation as colloidal particles like metal oxide fine particles. The theory thereof is stated in books (for example, Colloid Science I, Basis and Dispersion/Adsorption (TOKYO KAGAKU DOZIN CO., LTD.)). According to this book, fine particles in a liquid retain a dispersion condition or cause aggregation to the contrary due to a balance between repulsive force including electrostatic repulsive force and steric hindrance repulsive force and attractive force including van der Waals force.

In order to achieve the dispersion stabilization of a pigment, it has been proposed to use a graft polymer as the dispersion resin (see Japanese Patent Application Laid-Open Nos. H06-100810 and H10-87768). In these proposals, a graft polymer in which one of a main chain and a side chain is composed of a segment having high hydrophilicity and the other is composed of a segment having high hydrophobicity is used. The segment having high hydrophobicity is caused to be adsorbed on the surface of a pigment, and the segment having high hydrophilicity is brought into contact with an ink liquid, thereby enhancing electrostatic repulsive force and steric hindrance repulsive force to achieve dispersion stabilization.

At this time, the point for grafting the dispersion resin is that the segment having high hydrophobicity, which has a function of adsorbing on the surface of the pigment, and the segment having high hydrophilicity for improving the dispersion stability are separated in terms of the structure of the dispersion resin, whereby the respective functions are maximally developed. As described above, the structure of the resin is designed to achieve functional separation. Therefore, the hydrophobic segment favorably has higher hydrophobicity for enhancing the adsorptivity of the dispersion resin on the surface of the pigment, and the hydrophilic segment favorably has higher hydrophilicity for enhancing the dispersion stability of the pigment particles. On the other hand, a conventional ink used in ink jet recording generally contains water as a main component, to which a water-soluble high-boiling solvent such as glycol is added for the purpose of preventing clogging.

When such an ink has been used to conduct recording on plain paper, however, sufficient fixing ability has not been achieved. In addition, image irregularity may have occurred, which appears to be attributed to the uneven distribution of a filler or sizing agent on the surface of the recording medium. In particular, when a color image has been intended to form, a plurality of color inks has been applied one after another before they have been fixed to paper. Therefore, color bleeding and uneven color mixing have occurred at portions of boundaries between images of different colors (this phenomenon will hereinafter be referred to as "bleeding" simply), resulting in a failure to obtain satisfactory images.

As a method for improving color developability and resistance to bleeding, is mentioned a method in which the aggregating ability of pigment particles is improved after a pigment ink is impacted on the surface of paper. For example, there is a method in which the content of a hydrophilic monomer in a dispersion resin is lowered, thereby lowering the dispersion stability of pigment particles. In addition, as a means for improving resistance to bleeding and fixing ability to improve color developability, a recording method in which a reaction liquid having a high surface tension and containing a polyvalent metal salt is applied and a pigment ink having a low surface tension is then applied to conduct recording is disclosed (see Japanese Patent Application Laid-Open No. 2004-160996).

In a general recording method using no reaction liquid, when the dispersion stability of pigment particles is intended to be improved by a conventional technique, the aggregating ability of the pigment particles on the surface of a recording medium is lowered, so that the pigment particles tend to penetrate in the interior of the recording medium with the penetration of an ink. At this time, a phenomenon that a coloring material is partially repelled due to the uneven distribution of a filler or sizing agent on the surface of the recording medium occurs. A part of fiber on the surface of the recording medium in a printed region is exposed due to this phenomenon, so that sufficient color developability is not achieved. From this situation, it is understood that the dispersion stability of the pigment particles and the color developability become in a trade-off. On the other hand, in the method using the reaction liquid, the electrostatic repulsive force, which stabilizes the dispersion of the pigment particles, is reduced (substantially extinguished) by contact with the polyvalent metal salt, thereby aggregating the pigment particles. The aggregate fixes in the vicinity of the surface of the recording medium to cover the surface without exposing the fiber forming the recording medium in the printed region, thereby reducing bleeding and improving the color developability.

However, the pigment ink in which the pigment particles are dispersed by the dispersion resin whose hydrophobic segment and hydrophilic segment are separated for improving the dispersion stability as described above is strong in the electrostatic repulsive force and steric repulsive force acting between the pigment particles. As a result, the dispersion stability of the pigment particles is also improved, so that when such a pigment ink is applied to the recording method using the reaction liquid and the pigment ink, increase in the amount of pigment aggregate fixed to the surface of a recording medium cannot be expected owing to the improvement in dispersion stability, and so difficulty may be encountered on the improvement of color developability in some cases.

In a pigment ink wherein repulsive force for dispersion stabilization is generated by, for example, an anionic compound as a hydrophilic segment, the repulsive force for dispersion stabilization has been reduced by contact with the surface of a recording medium or a reaction liquid, thereby improving color developability. However, a phenomenon that the color developability is lower with the speeding-up of printing by a high-density recording head has been observed. The reason for this is that when droplets of the pigment ink ejected from the high-density recording head come into contact with the surface of the recording medium or the reaction liquid, a vigorous flow attending on the penetration of a liquid into the interior of the recording medium occurs on the surface of the recording medium as the printing is conducted at high speed from the recording head. An aggregate of the pigment particle formed by the contact of the surface of the recording medium or the reaction liquid with the pigment ink is disintegrated by such a vigorous flow of the liquid and finely pulverized. As a result, the pigment particles are easy to penetrate into the interior of the recording medium. A portion where the fiber on the surface of the recording medium is not covered with the pigment particles (is exposed) is increased. It is therefore considered that the color developability is lowered as the printing using the high-density recording head is speed up.

As described above, in the proposals to date, the pigment inks have been designed based on the notion of how aggregation is less caused for improving ejection stability from a recording head and storage stability. On the other hand, the mechanism of improving the color developability is based on the notion of how aggregation of the pigment ink is caused. Therefore, a pigment ink easier to aggregate has been able to improve the color developability. In other words, it has been necessary to add opposite properties to a pigment ink at the same time, and improvement in ejection stability and color developability of a recorded article have had the relationship of trade-off. Further, the pigment ink requires to have stronger aggregation force for conducting printing at high speed by the high-density recording head, so that it is more difficult to achieve both the improvement in ejection stability and the improvement in color developability. From the above, no pigment ink satisfying these all properties has been present.

SUMMARY OF THE INVENTION

It is accordingly an object of the present invention to provide an ink jet pigment ink having high ejection stability and storage stability. Another object is to provide an ink jet pigment ink and an ink set by which high color developability can be realized in a recorded portion even when printing is conducted at high speed by a high-density recording head.

The above objects can be achieved by the present invention described below.

Thus, the present invention provides an ink jet pigment ink comprising water, a pigment, a water-soluble organic solvent and a graft copolymer, wherein the graft copolymer has a hydrophilic segment and a hydrophobic segment, the hydrophobic segment is being obtained by copolymerizing an anionic monomer and an aromatic monomer represented by the following formula (I), and the hydrophilic segment is being obtained by polymerizing an anionic monomer

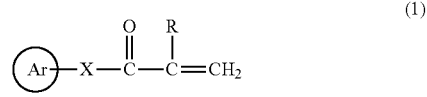

wherein Ar is an aromatic ring selected from a benzene ring, a condensed benzene ring and a hetero-aromatic ring, or a derivative thereof, R is H or $CH_3$, and X is O or NH.

The present invention also provides an ink set comprising the above-described ink jet pigment ink and such a reaction liquid that the particle size of the pigment is increased when the reaction liquid comes into contact with the pigment ink.

According to the present invention, there can be provided a pigment ink which has high ejection stability and storage stability (dispersion stability) suitable for ink jet recording and by which high fixing ability of a recorded portion formed at high speed by a high-density recording head is obtained, and high color developability can be realized, and an ink set.

Further features of the present invention will become apparent from the following description of exemplary embodiments.

DETAILED DESCRIPTION OF THE INVENTION

The details of the completion of the present invention as a result of an extensive investigation for solving the above problems are as follows.

First, properties required of a pigment ink at respective steps have been considered from a process of image recording with the pigment ink. The pigment ink is fed into a recording head from a condition being stored in an ink tank and goes through the following steps.

(1) A step of ejecting droplets of the pigment ink based on printing information.

(2) A step in which the ejected droplets of the pigment ink come into contact with a recording medium or with droplets of a reaction liquid applied in advance on the recording medium.

(3) A step in which an aggregate of pigment particles is caused in the droplets brought into contact to separate the aggregate from solvents in the ink and reaction liquid, the aggregate fixes on to the recording medium, and the solvents in the ink and reaction liquid penetrate into the interior of the recording medium.

A recorded article is formed on the recording medium through the step (3).

The step for which the dispersion stability is required among the three steps is the step (1), and that for which the aggregating ability is required is the step (3). In other words, both dispersion stability and aggregating ability are not required at the same time in a series of image recording steps. Thus, in the step (2), it is only necessary to accomplish switching-over in such a manner that the dispersion stability of the pigment ink is substantially extinguished and the aggregating ability is enhanced. Such a pigment ink has been considered to solve the problems. The material design for enhancing the dispersion stability is achieved by the dispersion resin whose hydrophobic segment and hydrophilic segment are separated so as to impart electrostatic repulsive force and steric repulsive force to the pigment particles as described above.

On the other hand, the high aggregating ability of the pigment is achieved by removing the repulsive force acting between the pigment particles and imparting to the pigment particles such a strong adhesive force between aggregates that the aggregates do not disintegrate even by the flow of a liquid on the surface of the recording medium. It is only necessary to cause such change in the physical properties of the pigment in the step (2), i.e., change of the pigment particles caused by the contact of the pigment ink with the surface of the recording medium or with the droplets of the reaction liquid. In order to remove the repulsive force acting between the pigment particles by the contact with the surface of the recording medium or with the droplets of the reaction liquid, it is only necessary to generate the electrostatic repulsive force and steric repulsive force contributing to the dispersion stability of the pigment particles using a compound having an anionic functional group. The reason for it is that the anionic functional group causes a salt forming reaction with a polyvalent metal ion contained in the recording medium or reaction liquid to lower the iconicity of the anionic group, and so an electrical double layer to be a source of the generation of the electrostatic repulsive force and a layer of hydration water hydrating to a hydrophilic segment to a source of the generation of steric hindrance repulsive force become small to substantially extinguish the repulsive force between the pigment particles. Accordingly, in order to maximally exhibit this effect, it is preferable that the hydrophilic segment contains an anionic monomer in a higher proportion. It is most favorable that substantially all constituent units except for a region connecting to a hydrophobic segment and an end portion of the hydrophilic segment to which a chain transfer agent or polymerization initiator is bonded are formed of the anionic monomer.

The adhesive force between the aggregates has not been taken into consideration in the investigations as to the conventional pigment inks. In other words, it is a problem newly brought to public notice that the color developability improving effect is gradually reduced when the printing is conducted at high speed by the high-density recording head. It is considered that this problem most affects the improvement of the color developability in the high-speed printing. The adhesion between the aggregates is formed by the physical adhesion by hydrophobic interaction. In other words, in order to increase the adhesive force thereof, it is necessary to enhance the hydrophilicity of the surface of the dispersion resin covering the surfaces of the pigment particles.

In order to improve the ejection stability as described above, it is necessary to advance the development of a material enhancing the dispersion stability. At this time, a hydrophobic segment is designed so as to be formed by only a functional group having a stronger hydrophobicity, and a hydrophilic segment is designed so as to be formed by only a functional group having a stronger hydrophilicity. As a result, the hydrophobic segment is intended to be strongly bonded to the surface of the pigment having a high hydrophobicity. Therefore, the hydrophobic segment is separated from the surface of the pigment after the contact with the reaction liquid and does not appear on the surface of the dispersion resin covering the surfaces of the pigment particles. It has been infeasible to develop interparticle adhesive force resistible to the vigorous flow in the droplets on the surface of the pigment even when the hydrophilicity of the hydrophilic segment has been lowered by its contact with the surface of the recording medium or the reaction liquid.

Thus, in order to increase the adhesive force between the pigment particles by the contact with the surface of the recording medium or the reaction liquid, the hydrophobicity of the surface of the dispersion resin covering the pigment particles is made to increase. To do so, there has been led to the notion that a hydrophilic group is introduced into the hydrophobic segment to the extent that the adsorption on the surface of the pigment is not impeded, wherein, for the hydrophilic group, an anionic functional group having the reactivity with a polyvalent metal ion contained in the surface of the recording medium or in the reaction liquid is introduced. In other words, an interaction with hydration water hydrated to the anionic group also contained in the hydrophobic segment or with a counter ion used in neutralization can be substantially eliminated by the contact with the surface of the recording medium or the reaction liquid. Structural change in the hydrophobic segment in such a dispersion resin is caused, whereby at least a part of the hydrophobic segment can be exposed to the surface of the dispersion resin to increase the interparticle adhesive force.

The preferred embodiments of the present invention will hereinafter be described to explain the present invention in more detail.

The ink according to the present invention is an ink jet pigment ink containing a graft copolymer having a hydrophilic segment and a hydrophobic segment, wherein the hydrophobic segment is obtained by copolymerizing an aromatic monomer represented by the following formula (1) and an anionic monomer, and the hydrophilic segment is obtained by polymerizing an anionic monomer. The hydrophobic segment in such a graft copolymer means a segment of which the proportion of the hydrophobic monomers to all monomers copolymerized for forming the hydrophobic segment is at least 50% by mass or more, favorably 70% by mass or more, more favorably 80% by mass or more.

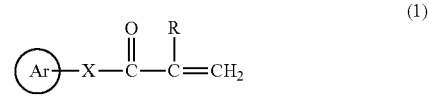

wherein Ar is an aromatic ring selected from a benzene ring, a condensed benzene ring and a hetero-aromatic ring, or a derivative thereof, R is H or CH$_3$, and X is O or NH.

The aromatic ring (Ar in the formula (1)) that the aromatic monomer in the present invention has may be not only a benzene ring or condensed benzene ring, but also a hetero-aromatic ring. The condensed benzene ring includes a naphthalene ring and an anthracene ring. The hetero-aromatic ring includes a pyridine ring, a carbazole ring and an imidazole ring. The derivative of the aromatic ring means a ring obtained by substituting one or more alkyl groups each having four or less carbon atoms on the aromatic ring.

Specific examples of the aromatic monomer include the following monomers: ester compounds of α,β-ethylenically unsaturated carboxylic acids with aryl alcohols, such as benzyl (meth)acrylate, 2-phenoxyethyl (meth)acrylate, 2-hydroxy-3-phenoxy (meth)acrylate and 2-(meth)acryloxyethylphthalic acid, and amide compounds of such carboxylic acids with arylamides. Incidentally, other monomers than the aromatic monomers, such as α,β-ethylenically unsaturated carboxylic esters of aliphatic alcohols, such as methyl (meth)acrylate, ethyl (meth)acrylate and butyl (meth)acrylate, may also be used in combination within limits not impeding the objects of the present invention.

Among the above-mentioned compounds, styrene and benzyl (meth)acrylate are preferred from the viewpoint of improving the dispersion stability. Here, "(meth)acrylate" means both "acrylate" and "methacrylate", and "(meth)acryloxy" means both "acryloxy" and "methacryloxy".

Examples of the anionic monomer include the following monomers: vinyl compounds having an anionic group, such as (meth)acrylic acid, (meth)acrylic acid derivatives, maleic acid, maleic acid derivatives, itaconic acid, itaconic acid derivatives, fumaric acid and fumaric acid derivatives. As the anionic compound, acrylic acid is preferred because the water solubility of a graft copolymer obtained by copolymerization becomes high. An $\alpha,\beta$-ethylenically unsaturated carboxylic ester of an aliphatic alcohol such as methyl (meth)acrylate, ethyl (meth)acrylate or butyl (meth)acrylate may be used to form a carboxyl group, which is an anionic group, by saponification after copolymerization.

The copolymerization ratio of the aromatic monomer (A) to the anionic monomer (B) for forming the hydrophobic segment is favorably from 2.5:1 to 20:1 in terms of monomer mass ratio A:B. The ratio A:B is more favorably from 4:1 to 16:1. If the proportion of the aromatic monomer becomes higher than this ratio, it is hard to impart sufficient adhesive force between aggregated particles and to enhance color developability upon high-speed printing. If the proportion of the aromatic monomer becomes lower than this ratio on the other hand, the resulting copolymer tends to lower the adsorptivity on the surface of the pigment to lower the storage stability of the resulting ink.

The hydrophilic segment means a segment of which the proportion of the hydrophilic monomers to all monomers copolymerized for forming the hydrophilic segment is at least 50% by mass or more. As the anionic monomer, there may be used the same anionic monomer as that described in the description for the hydrophobic segment.

From the same reason described for the hydrophobic segment, acrylic acid is preferred as the anionic monomer. Examples of monomers forming the hydrophilic segment include the following monomers: 2-hydroxy (meth)acrylate, N-vinylformamide, N-vinyl-acetamide, (meth)acrylamide and derivatives thereof. A monomer having a nonionic hydrophilic group may also be used to the extent that the aggregating ability is not impaired.

The graft copolymer used in the present invention is produced by copolymerizing these monomers. As a process for producing the graft copolymer, there may be used any publicly known process. Roughly described, the graft copolymer used in the present invention is produced according to the following processes: a graft-from process that a branch monomer is polymerized from a main polymer, a graft-onto process that a branch polymer is bonded to a main polymer, a graft-through process that a main polymer is copolymerized with a branch polymer, and a macromonomer process. Among these processes, the macromonomer process is a most effective and highly general-purpose process as a synthetic process of the graft copolymer because the branch polymer is already known, and polymer design can be easily made. The graft copolymer maximally exhibits the effect to improve ejection stability and color developability upon high-speed printing when the copolymer is used as a dispersion resin for a pigment. As the graft copolymer is preferred a copolymer of which the main chain is a hydrophobic segment and the side chain is a hydrophilic segment. When the main chain is the hydrophobic segment, a possibility that one molecule of the polymer may adsorb on the surfaces of plural pigment particles is extremely low, and so it is possible to produce a pigment ink having high dispersion stability.

In the ink according to the present invention, the graft copolymer favorably has a weight-average molecular weight within a range of from 1,000 or more to 30,000 or less, more favorably from 3,000 or more to 15,000 or less. The weight-average molecular weight of the side chain of the graft copolymer is favorably within a range of from 300 or more to 2,000 or less.

The graft copolymer used in the present invention contains at least an anionic monomer, and the proportion of the anionic monomer making up the graft copolymer is within a range of from 30 mg KOH/g or more to 320 mg KOH/g or less, more favorably from 50 mg KOH/g or more to 300 mg KOH/g or less, in terms of acid value. If the acid value is lower than this range, the resulting pigment ink tends to lower the dispersion stability and to deteriorate the ejection stability. If the acid value is higher than this range, such a graft copolymer tends to lower the adsorptivity on the surface of the pigment and to deteriorate the storage stability of the resulting pigment ink.

In order to improve the dispersion stability of the pigment by the anionic group in the graft copolymer as described above, the ink is favorably adjusted to be neutral or alkaline as a whole. In this case, however, the pH is favorably controlled within a range of from 7 to 10 because a too high alkalinity may form the cause of corrosion of various members used in an ink jet recording apparatus. Examples of a pH adjustor used at this time include the following compounds: various organic amines such as diethanolamine and triethanolamine; inorganic alkalis such as alkali metal hydroxides such as sodium hydroxide, lithium hydroxide and potassium hydroxide; and organic acids and mineral acids. Such a graft copolymer as described above is dispersed or dissolved in an aqueous liquid medium.

In the ink according to the present invention, the graft copolymer is favorably contained within a range of from 0.1% by mass or more to 15% by mass or less in total based on the total mass of the ink. When the graft copolymer is used as a dispersion resin for pigment, the copolymer is favorably contained within a range of from 0.1% by mass or more to 5% by mass or less based on the total mass of the ink. A natural resin such as rosin, shellac or starch, or another synthetic resin than the graft copolymer may also favorably be used as needed. The amount thereof is an amount not exceeding the amount of the graft copolymer added.

The ink according to the present invention contains at least a pigment, a water-soluble organic solvent and water in addition to the graft copolymer and resin described above. These components will hereinafter be described.

The ink according to the present invention contains a pigment. The content thereof is favorably within a range of from 1% by mass or more to 20% by mass or less, particularly favorably from 2% by mass or more to 12% by mass or less based on the total mass of the ink. In the present invention, such pigments as mentioned below may be used. First, a black pigment usable in the present invention is carbon black. Examples thereof include carbon black produced according to the furnace process or channel process. The carbon black favorably has such properties that the primary particle size is from 11 m$\mu$m (nm) or more to 40 m$\mu$m (nm) or less, the specific surface area is from 50 m$^2$/g or more to 400 m$^2$/g or less as determined according to the BET method, the volatile matter is from 0.5% by mass or more to 10% by mass or less, and the pH value is from 2 to 10. Examples of commercially-available carbon black having such properties include No.: 33, 40, 45, 52, 900, 2200B and 2300, MA7, MA8, and MCF88 (all, products of MITSUBISHI CHEMICAL COR- PORATION); RAVEN 1255 (product of Columbian Co.); REGAL: 330R, 400R and 660R, and MOGUL L (all, products of CABOT CO.); and Color Black FW1, Nipex 170IQ, Nipex 180IQ, Printex 95, Nipex 90, Printex 90, Printex 80, Printex 35 and Printex U (all, products of Degussa). All these commercially-available carbon black products may favorably be used.

Examples of yellow pigments usable in the present invention include C.I. Pigment Yellow: 1, 2, 3, 13, 16, 74, 83, 109, 128 and 155. Examples of magenta pigments include C.I. Pigment Red: 5, 7, 12, 48 (Ca), 48 (Mn), 57 (Ca), 57:1, 112 and 122, quinacridone solid solution, and C.I. Pigment Violet 19. Examples of cyan pigments include C.I. Pigment Blue: 1, 2, 3, 15:3, 15:4, 16 and 22, and C.I. Vat Blue: 4 and 6.

All the pigments mentioned above may be used either singly or in any combination thereof in their corresponding color inks. Needless to say, the present invention is not limited to these pigments. In addition to the above pigments, newly prepared pigments such as self-dispersion pigments may also be used.

An aqueous medium suitable for preparing the ink according to the present invention is a mixed solvent of water and a water-soluble organic solvent. As the water, it is favorable to use ion-exchanged water (deionized water) instead of tap water containing various ions.

As the water-soluble organic solvent used in combination with water, may be mentioned, for example, the following solvents: alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and keto-alcohols such as acetone and diacetone alcohol; ethers such as tetrahydrofuran and dioxane; polyalkylene glycols such as polyethylene glycol and polypropylene glycol; alkylene glycols the alkylene group of which has 2 to 6 carbon atoms, such as ethylene glycol, 1,2-propanediol, 1,3-propanediol, triethylene glycol, 1,5-pentanediol, thiodiglycol, hexylene glycol, 1,2-hexanediol and diethylene glycol; 1,2,6-hexanetriol and glycerol; lower alkyl ethers of polyhydric alcohols, such as ethylene glycol monomethyl (or ethyl)ether, diethylene glycol methyl (or ethyl) ether and triethylene glycol monomethyl (or ethyl) ether; and N-methyl-2-pyrrolidone, 2-pyrrolidone and 1,3-dimethyl-2-imidazolidinone. Among these water-soluble organic solvents, polyhydric alcohols such as diethylene glycol and lower alkyl ethers of polyhydric alcohols such as triethylene glycol monomethyl (or ethyl)ether are preferred.

The content of such a water-soluble organic solvent as described above in the ink is favorably within a range of from 3% by mass or more to 50% by mass or less, particularly favorably from 3% by mass or more to 40% by mass or less, based on the total mass of the ink. The content of water is favorably within a range of from 10% by mass or more to 90% by mass or less, particularly favorably from 30% by mass or more to 80% by mass or less, based on the total mass of the ink.

Besides the above-described components, additives such as a surfactant, an antifoaming agent and a preservative may be suitably added to the ink according to the present invention, as needed, to provide the ink with desired physical properties. The amount of such an additive added is favorably within a range of from 0.05% by mass or more to 10% by mass or less, particularly favorably from 0.2% by mass or more to 5% by mass or less, based on the total mass of the ink.

The ink of the present invention containing such components as described above is prepared in the following manner. The pigment is first added to an aqueous medium containing at least the graft copolymer and water, and the mixture is stirred. A dispersion treatment is then conducted by means of a dispersing unit described below, and as needed, a centrifugation is carried out to obtain a desired pigment dispersion liquid. An aqueous medium or such suitably selected additive components as mentioned above are then added to this pigment dispersion liquid as needed. The resultant mixture is stirred to prepare an ink according to the present invention.

When a base is added to a pigment dispersion liquid, which is a raw material for ink, upon the preparation of the pigment dispersion liquid, for dissolving the graft copolymer used in the present invention in the resulting ink, the dispersion stability of the ink can be improved. Examples of the base used in this case include the following bases: organic amines such as monoethanolamine, diethanolamine, triethanolamine and aminomethylpropanol, ammonia, and inorganic bases such as potassium hydroxide, sodium hydroxide and lithium hydroxide.

In the preparation process of the pigment ink, the pigment dispersion liquid obtained by conducting the dispersion treatment as described above is used in the preparation of the ink. It is effective to conduct premixing by adding the pigment to the aqueous medium containing at least the graft copolymer and water before the dispersion treatment conducted upon the preparation of the pigment dispersion liquid. In other words, such a premixing operation is preferred because it serves to improve the wettability of the surface of the pigment and facilitate adsorption of the dispersant on the pigment surface.

Any dispersing machine routinely used may be employed as a dispersing machine used in the dispersion treatment of the pigment. Examples thereof include ball mill, roll mill, sand mill, bead mill and nanomizer. Among these machines, the bead mill is favorably used. Examples of such a bead mill include Super Mill, Sand Grinder, Beads Mill, Agitator Mill, Grain Mill, Dyno Mill, Pearl Mill and Coball Mill (all, trade names).

In order to design the pigment ink to be suitably usable in an ink-jet recording method, it is favorable to use a pigment having an optimum particle size distribution from the viewpoint of resistance to clogging. As methods for obtaining a pigment having a desired particle size distribution, may be mentioned the following methods: a method in which the size of a grinding medium in such a dispersing machine as mentioned above is made smaller, a method in which the packing rate of a grinding medium is made higher, a method in which processing time is made longer, a method in which classification is conducted by a filter or centrifugal separator after grinding, and a combination of these methods.

The pigment ink according to the present invention is favorably used in combination with a reaction liquid containing at least a compound having an action of increasing the average particle size of the pigment fine particles contained in the ink upon contact with the ink. When the pigment ink and the reaction liquid are used as an ink set, a printed article higher in image density and good in color development can be provided.

The reaction liquid used in the present invention will hereinafter be described. A compound most suitable for use as the compound (reactive agent) having the action of increasing the average particle size of the pigment fine particles contained in the ink is a polyvalent metal salt. The polyvalent metal salt is formed from a divalent or still higher polyvalent metal ion and a counter anion to the polyvalent metal ion. Specific examples of the polyvalent metal ion include divalent metal ions such as $Ca^{2+}$, $Cu^{2+}$, $Ni^{2+}$, $Mg^{2+}$ and $Zn^{2+}$, and trivalent metal ions such as $Fe^{3+}$ and $Al^{3+}$. Examples of the anion coupled with these ions include $Cl^-$, $NO_3^-$ and $SO_4^{2-}$. These reactive agents react with the pigment in the ink in a moment to cause the action of increasing the average particle size of the pigment fine particles.

The reaction liquid used in the present invention has a composition containing at least such a reactive agent as described above and an aqueous medium. As the aqueous medium, is favorably used a mixed medium of water and a water-soluble organic solvent. As the water-soluble organic solvent, may be used any of the water-soluble organic solvents capable of being contained in the ink previously described. No particular limitation is imposed on the content of the water-soluble organic solvent in the reaction liquid in the present invention. However, the content is favorably within a range of from 5% by mass or more to 60% by mass or less, particularly favorably from 5% by mass or more to 40% by mass or less, based on the total mass of the reaction liquid.

As needed, additives such as a viscosity modifier, a pH adjustor, a preservative and an antioxidant may be suitably incorporated into the reaction liquid used in the present invention. Care needs to be given to the selection of a surfactant functioning as a penetration accelerator and the added amount thereof from the viewpoint of controlling the penetrability of the reaction liquid into a recording medium. In addition, the reaction liquid is favorably colorless, but may be palely colored within limits not changing the color tones of color inks when mixed with the respective inks on a recording medium. Further, the reaction liquid having such a composition as described above and used in the present invention is favorably adjusted in such a manner that the viscosity at about 25° C. falls within a range of from 1 mPa·s (cps) or more to 30 mPa·s (cps) or less.

EXAMPLES

The present invention will hereinafter be described more specifically by the following Examples and Comparative Examples. Incidentally, "parts" or "part" and "%" as will be described in the following examples are based on mass unless expressly noted.

Example 1

In this example, optimum pigment inks using a dispersion resin comprised of a graft copolymer of which the main chain is a hydrophobic segment and the side chain is a hydrophilic segment will be described.

(Preparation of Dispersion Resin A1)
(Synthesis of Macromonomer B1)

As raw materials for a hydrophilic segment making up a side chain, were used 20 parts of acrylic acid (anionic monomer), 4 parts of an α-methylstyrene dimer (chain transfer agent) and 0.4 part of azobisisobutyronitrile (radical polymerization initiator). Radical polymerization was conducted at a polymerization temperature of 110° C. over 3 hours under reflux of $N_2$ in 300 parts of 1-methoxy-2-propanol while adding the above raw materials dropwise. After completion of the drop addition, the polymerization reaction was conducted for additional 3 hours while keeping at 110° C. Thereafter, the contents were cooled to room temperature, the reaction product was developed in 1,000 parts of hexane to remove unreacted materials by precipitation purification, and the residue was dried under reduced pressure to obtain a macromonomer B1. At this time, the weight-average molecular weight (Mw) of the macromonomer B1, which will become a side chain of a dispersion resin A1, was 600.

(Synthesis of Dispersion Resin A1)

Ten parts of the above-obtained macromonomer B1 forming a side chain and having an anionic group was dissolved in 300 parts of 1-methoxy-2-propanol in advance, and the following monomers making up a main chain, which was a hydrophobic segment, and a polymerization initiator were mixed with the resultant solution. As the monomers making up the main chain, were used 60 parts of benzyl methacrylate, which was a hydrophobic aromatic monomer, 10 parts of n-butyl methacrylate, which was a hydrophobic aliphatic monomer, and 5 parts of acrylic acid, which was an anionic monomer, and 4 parts of azobisisobutyronitrile. A mixture of these monomers and the polymerization initiator was added dropwise into the 1-methoxy-2-propanol to conduct radical polymerization. At this time, the polymerization temperature was set to 110° C., and the drop addition time was set to 3 hours under reflux in $N_2$. After completion of the drop addition, the polymerization reaction was conducted for additional 3 hours while keeping at 110° C. Thereafter, the contents were cooled to room temperature, the reaction product was developed in 1,000 parts of hexane to remove unreacted materials by precipitation purification, and the residue was dried under reduced pressure to obtain a dispersion resin A1. The dispersion resin A1 is a graft copolymer having a structure of which the main chain is a hydrophobic segment and the side chain is a hydrophilic segment. The weight-average molecular weight of the dispersion resin A1 thus obtained was 5,800, and the acid value thereof was 100 mg KOH/g. The compositional ratio A:B of the aromatic monomer (A) to the anionic monomer (B) in the hydrophobic segment is 12:1.

(Ink)
(Preparation of pigment dispersion liquid K1)

| | |
|---|---|
| Dispersion resin A1 | 5 parts |
| Potassium hydroxide | 1 part |
| Isopropyl alcohol | 10 parts |
| Ion-exchanged water | 69 parts. |

The above components were mixed and heated to 70° C. in a water bath to completely dissolve the resin component. To this solution, were added 15 parts of carbon black (Nipex 180IQ, product of Degussa) to conduct premixing for 30 minutes, and a dispersing treatment was then conducted under the following conditions.

Dispersing machine: Bead mill UAM-015 (trade name, manufactured by KOTOBUKI INDUSTRIES CO., LTD.)
Grinding medium: zirconia beads (diameter: 0.05 mm, product of TOSOH CORPORATION)
Packing rate of grinding medium: 70% (by volume)
Grinding time: 1 hour.
A pigment dispersion liquid K1 was obtained by the above-described treatment.

(Preparation of Pigment Dispersion Liquid C1)

A pigment dispersion liquid C1 was obtained in the same manner as in the pigment dispersion liquid K1 except that the pigment was changed to a cyan pigment (IRGALITE Blue 8700, product of Ciba Speciality Chemicals) from carbon black in the pigment dispersion liquid K1.

(Preparation of Pigment Dispersion Liquid M1)

A pigment dispersion liquid M1 was obtained in the same manner as in the pigment dispersion liquid K1 except that the pigment was changed to a magenta pigment (CROMOPHTAL Pink PT, product of Ciba Speciality Chemicals) from carbon black in the pigment dispersion liquid K1.

(Preparation of Pigment Dispersion Liquid Y1)

A pigment dispersion liquid Y1 was obtained in the same manner as in the pigment dispersion liquid K1 except that the pigment was changed to a yellow pigment (IRGALITE Yellow GS, product of Ciba Speciality Chemicals) from carbon black in the pigment dispersion liquid K1.

(Preparation of Black Ink K1)

The above-described pigment dispersion liquid K1 was used, and the following components were mixed at the following compositional ratio to prepare a black ink K1.

| | |
|---|---|
| Pigment dispersion liquid K1 (pigment concentration: 5 parts) | 33 parts |
| Glycerol | 10 parts |
| Ethylene glycol | 5 parts |
| N-Methylpyrrolidone | 5 parts |
| Acetylenol EH (trade name, product of Kawaken Fine Chemicals Co., Ltd.) | 1 part |
| Ion-exchanged water | 46 parts. |

(Preparation of Cyan Ink C1)

A cyan ink C1 was obtained in the same manner as in the black ink K1 except that the pigment dispersion liquid K1 in the black ink K1 was changed to the pigment dispersion liquid C1.

(Preparation of Magenta Ink M1)

A magenta ink M1 was obtained in the same manner as in the black ink K1 except that the pigment dispersion liquid K1 in the black ink K1 was changed to the pigment dispersion liquid M1.

(Preparation of Yellow Ink Y1)

A yellow ink Y1 was obtained in the same manner as in the black ink K1 except that the pigment dispersion liquid K1 in the black ink K1 was changed to the pigment dispersion liquid Y1.

Evaluation (Evaluation of Color Developability Upon High-Speed Printing (Black Ink))

The evaluation of the black ink of Example 1 as to color developability was made according to the following method. The above-described ink was charged into an ink cartridge, and printing was conducted on LC-301 (product of Canon Inc.), which was plain paper, by a printing mode of high-speed printing using an ink jet printer PIXUS 850i (manufactured by Canon Inc.). With respect to the resultant printed article, evaluation was made on optical density in the following manner.

(Test A. Evaluation of Printed Article as to Optical Density)

The optical density of the printed article produced as described above was measured by means of a reflection densitometer RD-19I (manufactured by Gretag Macbeth) to evaluate the black ink K1 as to the color developability in terms of the optical density $OD_1$ according to the following standard. The evaluation result is shown in Table 1.

(Evaluation Standard)

A: $OD_1 > 1.4$
B: $1.2 < OD_1 \leq 1.4$
C: $OD_1 \leq 1.2$.

(Evaluation of Ejection Stability)

(Test B. Test in Ejection Stability)

The ejection stability of the ink was evaluated according to the following method and standard. Printing was continuously conducted on 1,000 sheets of the above-described plain paper with the black ink K1 by the above-described ink jet printer. After the continuous printing on the 1,000 sheets of plain paper, the optical density of a printed article prepared by the method described in the evaluation of color developability was measured by the same method as the test A. From the resultant optical density $OD_2$ and the optical density $OD_1$ measured by the same method on a printed article prepared before the test in ejection stability, the ratio $R_{OD}$ of $OD_2$ to $OD_1$ represented by $R_{OD}=OD_2/OD_1$ was determined to evaluate the black ink K1 as to the ejection stability according to the following standard. The evaluation result is shown in Table 1.

(Evaluation Standard)

A: $R_{OD} > 0.9$
B: $0.6 < R_{OD} \leq 0.9$
C: $R_{OD} \leq 0.6$.

(Evaluation of Color Developability Upon High-Speed Printing (Color Ink))

The evaluation of the color inks (cyan ink C1, magenta ink M1 and yellow ink Y1) prepared above as to color developability was made according to the following method. Printed articles were obtained in the same manner as in the black ink K1 except that an ink used was changed to the respective color inks. With respect to the resultant printed articles, evaluation was made on chroma in the following manner.

(Test A. Evaluation of Printed Article as to Chroma)

With respect to the hues of the resultant printed articles, coordinates of the L*a*b color space of the method of color difference specification prescribed by CIE were found by means of a reflection densitometer RD-19I (manufactured by Gretag Macbeth) to calculate out chroma $C^*_1$ values defined by the following equation. The chroma of each image was evaluated by this chroma $C^*_1$ value. In each color, a higher chroma value indicates the color developability of such an ink is high. The evaluation results are shown in Table 1.

$$C^*_1 = \{(a^*)^2 + (b^*)^2\}^{1/2}.$$

(Evaluation of Ejection Stability (Color Ink))

(Test B. Test in Ejection Stability)

The ejection stability of the inks was evaluated according to the following method and standard. Printing was continuously conducted on 1,000 sheets of the above-described plain paper with the color inks (cyan ink C1, magenta ink M1 and yellow ink Y1) by the above-described ink jet printer. With respect to printed articles obtained after the continuous printing on the 1,000 sheets of plain paper, Evaluation as to the chroma C 2 was made by the same method as the test A. From the resultant chroma $C^*_2$ values and chroma $C^*_1$ values measured by the same method on printed articles prepared before the test in ejection stability, the ratio $R_C$ of $C^*_2$ to $C^*_1$ represented by $R_C = C^*_2/C^*_1$ was determined to evaluate the color inks as to the ejection stability according to the following standard. The evaluation results are shown in Table 1.

(Evaluation Standard)

A: $R_C > 0.9$
B: $0.6 < R_C \leq 0.9$
C: $R_C \leq 0.6$.

TABLE 1

| | | Evaluation results | |
|---|---|---|---|
| Evaluation item | Ink No. | Test A Color developability | Test B Ejection stability |
| Example 1 | K1 | A | A |
| | C1 | 55 | A |
| | M1 | 65 | A |
| | Y1 | 85 | A |

As described above, the pigment inks according to the present invention could provide printed articles extremely high in color developability with all the inks even by high-speed printing and were high in ejection stability.

Example 2

In this example, a pigment ink using a dispersion resin comprised of a graft copolymer of which the main chain is a hydrophilic segment and the side chain is a hydrophobic segment will be described.

(Preparation of Dispersion Resin A2)
(Synthesis of macromonomer B2)

As raw materials for a hydrophobic segment making up a side chain, were used 50 parts of benzyl acrylate that is an aromatic monomer, 20 parts of maleic acid that is an anionic monomer, 10 parts of an α-methylstyrene dimer (chain transfer agent) and 1.5 parts of azobisisobutyronitrile. Radical polymerization was conducted under the same conditions as in Example 1 except that these compounds were used, to obtain a macromonomer B2. At this time, the weight-average molecular weight of the macromonomer B2, which will become a side chain of a dispersion resin A2, was 2,500. The compositional ratio of [the aromatic monomer] to [the anionic monomer] in the hydrophobic segment is 5:2.

(Synthesis of Dispersion Resin A2)

A dispersion resin A2 was prepared by radical polymerization according to the same process as in Example 1 except that the macromonomer B1 was changed to 12 parts of the macromonomer B2 prepared above, and the raw materials making up the main chain were changed to 30 parts of maleic acid, which was an anionic monomer. The weight-average molecular weight of the dispersion resin A2 thus obtained was 6,800, and the acid value thereof was 320 mg KOH/g.

(Preparation of Pigment Dispersion Liquid C2)

| | |
|---|---|
| Dispersion resin A2 | 5 parts |
| Potassium hydroxide | 2 parts |
| Isopropyl alcohol | 10 parts |
| Ion-exchanged water | 68 parts. |

The above components were mixed and heated to 70° C. in a water bath to completely dissolve the resin component. To this solution, were added 15 parts of a cyan pigment (FASTOGEN Blue 5380SD, product of Dainippon Ink & Chemicals, Incorporated) to conduct premixing for 30 minutes, and a dispersing treatment was then conducted under the same conditions as in Example 1 to obtain a pigment dispersion liquid C2.

(Preparation of Cyan Ink C2)

A cyan ink C2 was obtained in the same manner as in Example 1 except that the pigment dispersion liquid K1 in Example 1 was changed to the pigment dispersion liquid C2.

(Evaluation)

The cyan ink C2 was evaluated according to the same evaluation methods and evaluation standards as in the color inks of Example 1. The evaluation results are shown in Table 2.

TABLE 2

| | | Evaluation results | |
|---|---|---|---|
| Evaluation item | Ink No. | Test A Color developability | Test B Ejection stability |
| Example 2 | C2 | 50 | A |

As described above, the pigment ink according to the present invention could provide printed articles extremely high in color developability and was high in ejection stability.

Example 3

In this example, a pigment ink using a dispersion resin comprised of a graft copolymer of which the main chain is a hydrophobic segment and the side chain is a hydrophilic segment will be described.

(Preparation of Dispersion Resin A3)

A graft copolymer was obtained by radical polymerization in the same manner as in Example 1 except that 25 parts of AW-6S (isobutyl methacrylate macromonomer, product of Toagosei Chemical Industry Co., Ltd.; weight-average molecular weight: 11,000) as a macromonomer B3 forming a side chain, which was a hydrophilic segment, was dissolved in 300 parts of 1-methoxy-2-propanol in advance, and 60 parts of 2-phenoxyethyl methacrylate, which was an aromatic monomer, 20 parts of methacrylic acid, which was an anionic monomer, and 4 parts of azobisisobutyronitrile were used as raw materials forming a main chain, which was a hydrophobic segment.

Then, 10 parts of the graft copolymer was dissolved in 100 parts of ion-exchanged water, in which 30 parts of potassium hydroxide had been dissolved, to hydrolyze the isobutyl group of the isobutyl methacrylate macromonomer that is the side chain for 3 hours at 70° C. Hydrochloric acid was added to precipitate the resin dissolved, and the resin was washed with methanol and then dried under reduced pressure to obtain a dispersion resin A3. The dispersion resin A3 is a graft copolymer having a structure in which the main chain is a hydrophobic segment formed by 2-phenoxyethyl methacrylate and methacrylic acid, and the side chain is a hydrophilic segment formed by methacrylic acid obtained by the hydrolysis of isobutyl methacrylate. The weight-average molecular weight of the dispersion resin A3 thus obtained was 15,200, and the acid value thereof was 310 mg KOH/g. The compositional ratio A:B of the aromatic monomer (A) to the anionic monomer (B) in the hydrophobic segment was 3:1.

(Preparation of Pigment Dispersion Liquid M2)

A pigment dispersion liquid M2 was obtained in the same manner as in Example 2 except that CROMOPHTAL MAGENTA St (product of Ciba Speciality Chemicals), which was a magenta pigment, was used as the pigment.

(Preparation of Magenta Ink M2)

A magenta ink M2 was obtained in the same manner as in Example 1 except that the pigment dispersion liquid K1 in Example 1 was changed to the pigment dispersion liquid M2.

(Evaluation)

The magenta ink M2 thus obtained was evaluated according to the same evaluation methods and standards as in the color inks of Example 1. The evaluation results are shown in Table 3.

TABLE 3

| | | Evaluation results | |
|---|---|---|---|
| Evaluation item | Ink No. | Test A Color developability | Test B Ejection stability |
| Example 3 | M2 | 60 | A |

As described above, the pigment ink according to the present invention could provide printed articles extremely high in color developability and was high in ejection stability.

Example 4

In this example, a case where acrylic acid was used as an anionic monomer for side chain will be described.

(Preparation of Dispersion Resin A4)
(Synthesis of dispersion resin A4)

A dispersion resin A4 was prepared by radical polymerization under the same conditions as in Example 1 except that 25 parts of the macromonomer B1 prepared in Example 1 was used, and the following compounds were used as raw materials for a hydrophobic segment making up a main chain. As the raw materials for the hydrophobic segment, were used 60 parts of benzyl methacrylate, which was an aromatic monomer, 20 parts of methacrylic acid, which was an anionic monomer, and 4 parts of azobisisobutyronitrile. The weight-average molecular weight of the dispersion resin A4 thus obtained was 5,600, and the acid value thereof was 320 mg KOH/g. The compositional ratio of [the aromatic monomer] to [the anionic monomer] in the hydrophobic segment of the main chain is 3:1.

(Preparation of Pigment Dispersion Liquid Y2)

A pigment dispersion liquid Y2 was obtained in the same manner as in Example 2 except that a yellow pigment (Hansa Brilliant Yellow 5GXB, product Clariant Japan) was used as the pigment.

(Preparation of Yellow Ink Y2)

A yellow ink Y2 was obtained in the same manner as in Example 1 except that the pigment dispersion liquid K1 in Example 1 was changed to the pigment dispersion liquid Y2.

(Evaluation)

The yellow ink Y2 thus obtained was evaluated according to the same evaluation methods and standards as in the color inks of Example 1. The evaluation results are shown in Table 4.

TABLE 4

| | | Evaluation results | |
|---|---|---|---|
| Evaluation item | Ink No. | Test A Color developability | Test B Ejection stability |
| Example 4 | Y2 | 80 | A |

As described above, the pigment ink according to the present invention could provide printed articles extremely high in color developability and was high in ejection stability.

(Examples 5 to 10)

In these examples, cases where acrylic acid was used as an anionic monomer forming a hydrophilic segment of a side chain and as an anionic monomer forming a hydrophobic segment of a main chain will be described.

(Preparation of Dispersion Resins A5 to A10)
(Synthesis of dispersion resins A5 to A10)

Dispersion resins A5 to A10 were prepared by radical polymerization under the same conditions as in Example 1 except that 25 parts of the macromonomer B1 prepared in Example 1 was used, and the following respective compounds were used as raw materials for a hydrophobic segment making up a main chain. As the raw materials for the hydrophobic segment, were used benzyl methacrylate, which was an aromatic monomer, and acrylic acid, which was an anionic monomer. The copolymerization ratios between the respective monomers at this time were as shown in Table 5.

TABLE 5

| | | Main chain unit | | | | |
|---|---|---|---|---|---|---|
| | | Hydrophobic segment (parts) | | | Acid value | |
| Copolymerization ratio | Dispersion resin No. | Benzyl methacrylate | Acrylic acid | Aromatic:anion | [mg KOH/g] | Mw |
| Example 5 | A5 | 30 | 10 | 3:1 | 310 | 6,800 |
| Example 6 | A6 | 40 | 10 | 4:1 | 200 | 5,800 |
| Example 7 | A7 | 60 | 10 | 6:1 | 170 | 6,700 |
| Example 8 | A8 | 75 | 5 | 15:1 | 120 | 7,000 |
| Example 9 | A9 | 80 | 5 | 16:1 | 50 | 8,000 |
| Example 10 | A10 | 100 | 5 | 20:1 | 30 | 8,800 |

(Preparation of Pigment Dispersion Liquids K2 to K7)

Pigment dispersion liquids K2 to K7 were obtained in the same manner as in Example 1 except that the dispersion resins A5 to A10 were respectively used as the dispersion resin.

(Preparation of Black Inks K2 to K7)

Black inks K2 to K7 were obtained in the same manner as in the black ink K1 of Example 1 except that the above respective pigment dispersion liquids were used as the pigment dispersion liquid. The black inks thus obtained were evaluated according to the same evaluation methods and evaluation standards as in the black ink of Example 1. The evaluation results are shown in Table 6.

TABLE 6

| | | Evaluation results | | |
|---|---|---|---|---|
| | Ink No. | Dispersion resin | Test A Color developability | Test B Ejection stability |
| Example 5 | K2 | A5 | B | A |
| Example 6 | K3 | A6 | A | A |
| Example 7 | K4 | A7 | A | A |
| Example 8 | K5 | A8 | A | A |
| Example 9 | K6 | A9 | A | A |
| Example 10 | K7 | A10 | B | B |

As described above, the pigment inks according to the present invention could provide printed articles extremely high in color developability with all the inks even by high-speed printing and were high in ejection stability.

Examples 11 to 16

In these examples, cases where dispersion reasons, the weight average molecular weights of hydrophilic segments of side chains of which were varied, were used will be described.

(Preparation of Dispersion Resins A11 to A16)

(Synthesis of macromonomers B4 to B9)

Macromonomers B4 to B9 were prepared in the same manner as in Example 1 except that acrylic acid (AA) as the raw material, the α-methylstyrene dimer (MSD) as the chain transfer agent, azobisisobutyronitrile (AIBN) as the polymerization initiator and 1-methoxy-2-propanol (PGM) as the polymerization solvent were used in their corresponding proportions shown in Table 7.

(Preparation of Black Inks K8 to K13)

Black inks K8 to K13 were obtained in the same manner as in Example 1 except that the above respective pigment dispersion liquids were used as the pigment dispersion liquid. The black inks thus obtained were evaluated according to the same evaluation methods and evaluation standards as in the black ink of Example 1. The evaluation results are shown in Table 8.

TABLE 8

| | | Evaluation results | | | | | |
|---|---|---|---|---|---|---|---|
| | | Dispersion resin | | | | | |
| | Ink No. | Dispersion resin | Mw | Acid value [mg KOH/g] | Macromonomer | Test A Color developability | Test B Ejection stability |
| Ex. 11 | K8 | A11 | 6,000 | 300 | B4 | B | B |
| Ex. 12 | K9 | A12 | 6,500 | 300 | B5 | A | A |
| Ex. 13 | K10 | A13 | 5,500 | 300 | B6 | A | A |
| Ex. 14 | K11 | A14 | 5,800 | 300 | B7 | A | A |
| Ex. 15 | K12 | A15 | 6,200 | 300 | B8 | A | A |
| Ex. 16 | K13 | A16 | 6,700 | 300 | B9 | A | B |

TABLE 7

| | Macromonomer | Compositional ratio (parts) | | | | Weight average molecular weight |
|---|---|---|---|---|---|---|
| | | AA | MSD | AIBN | PGM | |
| Example 11 | B4 | 20 | 4 | 0.4 | 100 | 2,100 |
| Example 12 | B5 | 20 | 4 | 0.4 | 150 | 2,000 |
| Example 13 | B6 | 20 | 4 | 0.5 | 200 | 1,500 |
| Example 14 | B7 | 20 | 4 | 0.7 | 250 | 800 |
| Example 15 | B8 | 20 | 4 | 1 | 400 | 300 |
| Example 16 | B9 | 20 | 4 | 1 | 500 | 200 |

(Synthesis of Dispersion Resins A11 to a 16)

Dispersion resins A11 to A16 were prepared by radical polymerization under the same conditions as in Example 1 except that 25 parts of the macromonomers B4 to B9 shown in the above Table were respectively used, and the following respective compounds were used as raw materials for a hydrophobic segment making up a main chain. As the raw materials for the hydrophobic segment, were used 40 parts of benzyl methacrylate, which was an aromatic monomer, 10 parts of acrylic acid, which was an anionic monomer, and 4 parts of azobisisobutyronitrile. The monomer ratio of [the aromatic monomer] to [the anionic monomer] in the hydrophobic segment of the main chain is 4:1.

(Preparation of Pigment Dispersion Liquids K8 to K 13)

Pigment dispersion liquids K8 to K13 were obtained in the same manner as in Example 1 except that the dispersion resins A11 to A16 were respectively used as the dispersion resin.

As described above, the pigment inks according to the present invention could provide printed articles extremely high in color developability with all the inks even by high-speed printing and were high in ejection stability.

Example 17

In this example, a case where an ink set composed of a reaction liquid and the pigment inks was used will be described.

(Preparation of Reaction Liquid S1)

After the following components were mixed, the mixture was filtered to prepare a reaction liquid S1.

| | |
|---|---|
| Diethylene glycol | 10.0 parts |
| Methyl alcohol | 5.0 parts |
| Magnesium nitrate | 3.0 parts |
| Acetylenol EH (trade name, product of Kawaken Fine Chemicals Co., Ltd.) | 0.1 part |
| Ion-exchanged water | 81.9 parts. |

(Preparation of Ink Set and Evaluation)

The reaction liquid S1 obtained above, the black ink K2 and the color inks C2, M2 and Y2 were combined with one another to provide an ink set according to the present invention. The inks K2, C2, M2 and Y2 used were those prepared in Example 5, and Examples 2 to 4, respectively. The ink set thus obtained was used to obtain a printed article by first applying the reaction liquid S1 to the same recording paper as that used in Example 1 and then applying the inks K2, C2, M2 and Y2 so as to bring the respective inks into contact with the reaction liquid S1.

(Evaluation)

The printed article thus obtained was evaluated according to the evaluation methods and evaluation standards described in Example 1. The evaluation results are shown in Table 9.

TABLE 9

| Evaluation item | Ink No. | Test A Color developability | Test B Ejection stability |
|---|---|---|---|
| Example 17 | K2 | A | A |
|  | C2 | 56 | A |
|  | M2 | 67 | A |
|  | Y2 | 87 | A |

As apparent from this example, the color developability of the printed portions can be more improved by providing the ink set using the reaction liquid.

Comparative Example 1

In this comparative example, a case where a random polymer was used as a dispersion resin will be described.
(Synthesis of Dispersion Resin A17)
(Synthesis of dispersion resin A17)
As monomers, were used 60 parts of benzyl methacrylate, which was a hydrophobic aromatic monomer, 15 parts of acrylic acid, which was an anionic monomer, and 10 parts of n-butyl methacrylate, which was a hydrophobic aliphatic monomer. Four parts of azobisisobutyronitrile, which was a radical polymerization initiator, was mixed to these monomers to use the mixture as a raw material. This raw material was added dropwise into 300 parts of 1-methoxy-2-propanol to conduct radical polymerization. At this time, the polymerization temperature was set to 110° C., and the drop addition time was set to 3 hours under reflux in $N_2$. After completion of the drop addition, the polymerization reaction was conducted for additional 3 hours while keeping at 110° C. Thereafter, the contents were cooled to room temperature, the reaction product was developed in 1,000 parts of hexane to remove unreacted materials by precipitation purification, and the residue was dried under reduced pressure to obtain a dispersion resin A17. The dispersion resin A17 is a random copolymer. The weight-average molecular weight of the dispersion resin A17 thus obtained was 6,200, and the acid value thereof was 100 mg KOH/g.
(Preparation of Pigment Dispersion Liquid K14)
A pigment dispersion liquid K14 was obtained in the same manner as in Example 1 except that the dispersion resin A17 was used as the dispersion resin.
(Preparation of Black Ink K14)
A black ink K14 was obtained in the same manner as in Example 1 except that the above-described pigment dispersion liquid was used as the pigment dispersion liquid. The black ink thus obtained was evaluated according to the evaluation methods and evaluation standards described in the black ink of Example 1. The evaluation results are shown in Table 10.

TABLE 10

| Evaluation item | Ink No. | Test A Color developability | Test B Ejection stability |
|---|---|---|---|
| Comp. Example 1 | K14 | A | C |

In the ink of this comparative example, the color developability upon high-speed printing could be secured, but ejection stability was insufficient.

Comparative Example 2

In this comparative example, a case where a dispersion resin was formed by a graft copolymer of which the hydrophobic segment is formed by only a monomer having a hydrophobic group and the hydrophilic segment is formed by only a monomer having a non-anionic hydrophilic group will be described.
(Synthesis of Dispersion Resin A18)
(Synthesis of macromonomer B10)
A macromonomer B10 was obtained in the same manner as in Example 1 except that acrylic acid (AA) of an anionic monomer was changed to 20 parts of 2-hydroxyethyl acrylate that is a monomer having a non-anionic hydrophilic group. The macromonomer B10 thus obtained had a weight average molecular weight of 800.
(Synthesis of Dispersion Resin A18)
A dispersion resin A18 was prepared in the same manner as in Example 1 except that the macromonomer B1 was changed to 10 parts of the macromonomer B10, 60 parts of benzyl methacrylate, which was an aromatic monomer, and 10 parts of n-butyl methacrylate, which was an aliphatic monomer, were used as monomers making up a main chain, and 4 parts of azobisisobutyronitrile was used as a radical polymerization initiator. The weight average molecular weight of the dispersion resin A18 thus obtained was 6,200.
(Preparation of Pigment Dispersion Liquid K15)
A pigment dispersion liquid K15 was obtained in the same manner as in Example 1 except that the dispersion resin A18 was used as the dispersion resin.
(Preparation of Black Ink K15)
A black ink K15 was obtained in the same manner as in Example 1 except that the above-described pigment dispersion liquid was used as the pigment dispersion liquid. The black ink thus obtained was evaluated according to the evaluation methods and evaluation standards described in the black ink of Example 1. The evaluation results are shown in Table 11.

TABLE 11

| Evaluation item | Ink No. | Test A Color developability | Test B Ejection stability |
|---|---|---|---|
| Comp. Example 2 | K15 | C | A |

In the ink of this comparative example, the ejection stability could be secured, but color developability upon high-speed printing was insufficient.

Comparative Example 3

In this comparative example, a case where a dispersion resin was formed by a graft copolymer of which the hydrophobic segment is formed by only a monomer having a hydrophobic group and the anionic monomer is contained in a hydrophilic segment will be described.
(Synthesis of Dispersion Resin A19)
(Synthesis of dispersion resin A19)
A dispersion resin A19 was obtained in the same manner as in Example 1 except that 15 parts of the macromonomer B1 was used in a hydrophilic segment making up a side chain, 60 parts of benzyl methacrylate, which was an aromatic monomer, and 10 parts of n-butyl methacrylate, which was an aliphatic monomer, were used as monomers making up a main chain, and 4 parts of azobisisobutyronitrile was used as a radical polymerization initiator. The weight average molecular weight of the dispersion resin A19 thus obtained was 5,600, and the acid value of the dispersion resin 19 was 100 mg KOH/g.

(Preparation of Pigment Dispersion Liquid K16)

A pigment dispersion liquid K16 was obtained in the same manner as in Example 1 except that the dispersion resin A19 was used as the dispersion resin.

(Preparation of Black Ink K16)

A black ink K16 was obtained in the same manner as in Example 1 except that the above-described pigment dispersion liquid was used as the pigment dispersion liquid. The black ink thus obtained was evaluated according to the evaluation methods and evaluation standards described in the black ink of Example 1. The evaluation results are shown in Table 12.

TABLE 12

| Evaluation item | Ink No. | Test A Color developability | Test B Ejection stability |
| --- | --- | --- | --- |
| Comp. Example 3 | K16 | C | A |

In this comparative example, the ejection stability could be secured, but color developability upon high-speed printing was insufficient.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-114678, filed Apr. 24, 2007, which is hereby incorporated by reference in its entirety.

What is claimed is:

1. An ink jet pigment ink comprising:
water;
a pigment;
a water-soluble organic solvent; and
a graft copolymer, wherein the graft copolymer has a hydrophilic segment and a hydrophobic segment, the hydrophobic segment being obtained by copolymerizing an anionic monomer and an aromatic monomer, the hydrophilic segment being obtained by polymerizing an anionic monomer,
wherein the graft copolymer has a main chain that is the hydrophobic segment and has a side chain that is the hydrophilic segment,
wherein the hydrophobic segment has a copolymerization ratio of the aromatic monomer (A) to the anionic monomer (B) being from 4:1 to 16:1 in terms of monomer mass ratio A:B,
wherein the side chain of the graft copolymer has a weight average molecular weight of from 300 or more to 2,000 or less,
wherein the anionic monomer contained in the hydrophilic segment and in the hydrophobic segment is acrylic acid, and
wherein the aromatic monomer contained in the hydrophobic segment is benzyl methacrylate.

2. The ink jet pigment ink according to claim 1, wherein the proportion of the hydrophobic monomer to all the monomers making up the hydrophobic segment is 50% by mass or more in terms of a mass ratio.

3. The ink jet pigment ink according to claim 1, wherein the graft copolymer has an acid value of from 50 mg KOH/g or more to 300 mg KOH/g or less.

4. An ink set comprising a pigment ink and such a reaction liquid that the particle size of a pigment is increased when the reaction liquid comes into contact with the pigment ink, wherein the pigment ink is the ink jet pigment ink according to claim 1.

5. The ink jet pigment ink according to claim 1, wherein the side chain of the graft copolymer has a weight average molecular weight of from 300 or more to 800 or less.

* * * * *